Patented Oct. 13, 1942

2,298,533

UNITED STATES PATENT OFFICE 2,298,533

CAPILLARY ACTIVE CONDENSATION PRODUCT

Winfrid Hentrich, Rodleben, near Dessau-Rosslau, Anhalt, and Erik Schirm, Dessau, Anhalt, Germany, assignors, by mesne assignments, to "Unichem" Chemikalien Handels A.-G., Zurich, Switzerland, a corporation of Switzerland No Drawing. Application February 14, 1939, Serial No. 256,386. In Germany February 14, 1938

8 Claims. (Cl. 260—248)

This present invention relates to capillary active condensation products and their production. More particularly it relates to the production of capillary active condensation products produced by introducing hydrophile and lipophile groups into heterocyclic compounds containing at least two —C(halogen)=N— groups.

The principal object of this invention is to provide industry, particularly the textile, leather, and allied branches of industry, with an effective and stable class of capillary active agents especially suitable for surface treatment.

Another object of the invention is to provide a simple and feasible method for producing valuable capillary active compounds which find utility in industry wherever dispersing, wetting, impregnating, dissolving, stabilizing and the like are problems. Other purposes of the invention will clearly appear from the illustrations and examples which appear hereinafter.

According to the instant invention commercially valuable condensation products are produced by condensing heterocyclic compounds having at least two —C(halogen)=N— groups in any sequence with at least one compound having at least one reactive hydrogen atom and one or more lipophile groups, and on the other hand, with at least one compound containing at least one reactive hydrogen atom and one or more hydrophile groups. The compounds containing one or more reactive hydrogen atoms may also contain in addition the lipophile or hydrophile groups at least one OH, SH, NH$_2$ or NHR group, where R is hydrogen or any desirable hydrocarbon group. Furthermore, these reactive compounds may contain heteroatomic radicals, either hetero atoms or hetero atomic groups.

In accordance with another embodiment of the invention the condensation products of this invention are obtained by condensing the halogen-containing heterocyclic compounds in separate steps with the compounds resulting from the usual splitting of the lipophile or hydrophile compounds instead of with these compounds themselves.

The conversion between the heterocyclic compounds and the reactive compounds containing lipophile or hydrophile groups takes place under mild conditions when the reagents are dissolved in suitable solvents such as in water and in the presence of acid-binding agents, such as, for instance, sodium acetate, alkaline or alkaline earth formates, oxides or hydroxides, carbonates, calcium carbonate, pyridine and the like. The conversion ensues in most cases quantitatively and the intermediate condensation products as well as the end-condensation products are subject to treatment according to commercially feasible methods.

When the compounds of the present invention are dissolved in organic solvents such as hydrocarbons, alcohols, and the like, they may be used conjointly with super-fatting agents, enzymes, as well as with known filling agents. The compounds may be produced in a variety of forms, for instance, in the form of powders, flakes, chips, particles, noodles, and the like for household and other uses. On the other hand they may be dissolved or emulsified in liquids or they may be used in the form of a pliable mass, pastes, and creams. In fact, they may be produced in a variety of forms such as those forms found useful in the cosmetics and pharmaceutical industries as, for instance, in the form of polishes, soaps, creams and the like.

The condensation products obtained in accordance with the foregoing processes are characterized by possessing capillary active properties and by having a pronounced colloidal character. Due to these properties they may be used for the production of foam emulsions and as agents for dispersing, wetting, impregnating, peptizing, stabilizing, equalizing, dissolving, spreading and the like in various industries. They are especially useful as helping agents in the leather and textile industries, finding use in exceedingly varied processes, as for instance in the processes of brightening, glazing and sizing especially in providing water-repellent sizing, in dyeing processes, for instance when dyeing with substantive dyes, in the treatment of materials after dyeing, especially when rendering dyes directly applied to cellulose fibers waterproof, and in vat dyeing processes. Apart from the aforesaid industrial uses the condensation products are useful for the washing, cleaning and bleaching of textiles of varied kinds, such as lingerie, household goods, and the like.

Some of the these products also have the surprising quality of being disinfectant in character and may be used advantageously for the purpose of simultaneously disinfecting and cleaning. Others surprisingly possess tanning characteristics and therefore may be used in the tanning industry.

It is not necessary to use the compounds produced in accordance with the present invention alone as they are stable in mixture with many other compounds. They may be used in acid, neutral, and alkaline liquids and baths even in those which contain electrolytes or water-hardening agents. The compounds may also be used in mixture with alkaline salts such as alkaline carbonates, tri-sodium phosphate and other alkali phosphates, also with water glass alkaline m-silicates, borax and alkaline borates. They may likewise be used with neutral agents, such as sodium sulfate or acidic agents, such as sodium acid sulfate, or they may be used with a combination of such agents. These capillary active agents provide valuable addition agents for use with oxygen delivering compounds as, for instance, hydrogen super-oxide or per-salts. It is not necessary to use these compounds as sole capillary active agents as they may also be used with other wetting, foaming, emulsifying, dispersing, washing, cleaning, soaking, rinsing, impregnating and similar agents.

The heterocyclic compounds used as raw materials for this process, having at least two —C(halogen)=N— groups, are mainly the halogenides of the 1,3,5-triazine, i. e., the cyanuric halogenides although halogenides of the diazine such as pyrimidine and pyrazine may be used. Other valuable raw materials may be selected from the halogenides of di- and triazoles, such as those of 1,2,3 triazole, quinazoline, quinoxaline, phthalazine, and the like.

The higher molecular primary or secondary amines, mercaptans or alcohols, having a hydrocarbon group containing at least six carbon atoms wherein the hydrocarbon group is of a straight or branched chained aliphatic, cycloaliphatic or fatty aromatic nature form the preferred group of compounds having lipophilic qualities as well as reactive hydrogen atoms. The amino, mercapto, or hydroxyl group may also be found in an aromatic group which in turn is substituted by one or more alkyl-, cycloalkyl- and like groups, such substituent may be introduced into the aromatic group either directly or by the agency of hetero-atoms or heteroatomic groups. Quite generally, the hydrocarbon groups of these amines, mercapto- and hydroxyl compounds may contain hetero-atoms and hetero-atomic groups, such as oxygen, sulfur, nitrogen, halogen-, sulfonyl, carbonylester-, carboxylamide-, sulfonamide-, alkoxy groups, and the like. As compounds suitable for the condensation containing one or more lipophil groups, are to be named, for instance: octyl-amine, dodecyl-amine, N-dodecyl-N-methylamine, N-dodecyl-N-oxyethylamine, octadecenyl-amine, 2-amine-n-octane, di-isobutylamine, beta-ethyl-hexylamine, dodecyl-mercaptan, montanyl-mercaptan, as well as corresponding alcohols, such as octyl alcohol, 1,12-dihydroxy octadecane, and the like. As cycloaliphatic amines, mercaptans and alcohols are to be named: cyclohexylamine, cyclohexylamines substituted in the nucleus by higher alkyl groups, decahydro-naphthylamine, cyclohexylmercaptans, naphthenylmercaptans, as well as the corresponding alcohols, such as cyclohexanol, cyclohexanols substituted in the nucleus by higher alkyl groups, tetrahydromenaphthyl alcohol, decahydronaphthols. Furthermore, there may be used mixed types of these series, especially those compounds containing aromatic hydrocarbon groups, such as, for instance, benzyl-amine, menaphthylamine, tetrahydromenaphthylamine, p-dodecylaniline, p-(tetramethylbutyl)-aniline, 2-amino-4-iso-octylphenol, 4-aminophenol-n-octylether, 3-amino-1-lauryl benzol, benzyl mercaptan, menaphthyl mercaptan, as well as the corresponding hydroxyl compounds, for instance, phenols, naphthols and the like, substituted in the nucleus by longer straight or branched alkyl groups.

As compounds having hydrophilic properties as well as a reactive hydrogen atom or atoms, one may use primary or secondary aliphatic, cycloaliphatic, aromatic or fatty aromatic amino, mercapto, or hydroxy sulfo-acids, or amino, mercapto or hydroxy carboxylic acids; also amino alkyl sulfuric acid esters; amino cycloalkyl sulfuric acid ester, mercaptoalkyl sulfuric acid esters, amino or mercapto mono and polyalcohols, or amino or mercapto ethers and polyether alcohols; polyalcohols; diamines with a primary and a tertiary amino group; amino or mercapto compounds containing quaternary ammonium groups or betaine groups, and the like. Such hydrophile compounds are, for instance, amino ethane sulfonic acid, alkyl amino ethane sulfonic acids, amino ethyl sulfuric acid esters, amino benzol and naphthalene mono- or polysulfonic acids, amino carboxylic acids from egg white decomposition products, such as, for instance, lysalbinic acid, amino phenyl acetic acid, amino cresoxy acetic acid, mercapto ethane sulfonic acid, beta amino ethyl alcohol, glucamine, polyglycol, polyglycerine, 4-amino dimethyl aniline, m-amino phenyl trimethyl ammonium chloride, and the like. The hydrocarbon groups of the compounds with hydrophile groups may also contain hetero-atoms and hetero-atomic groups.

Inasmuch as the compounds which contain hydrophile and lipophile groups used in the instant invention contain hetero-atomic radicals such as hetero-atoms or hetero-atomic groups, as illustrated by O, S, N, NR, $SO_2$, COO, OCO, CONH, $SO_2NH$, $NHSO_2$ and the like, where R is hydrogen or any desired hydrocarbon group, the introduction of these compounds may also be made into the hetero-cyclic compounds with at least two —C(halogen)=N— groups in steps, which involve introducing in lieu of these compounds per se, the compounds resulting from a splitting of the molecule at the hetero atoms, or at the hetero atomic groups. When proceeding in this manner, the halogen-containing heterocyclic compounds may be condensed first with compounds containing besides a reactive hydrogen atom another reactive group such as amino-, mercapto- or hydroxyl groups or other groups capable of conversion into reactive groups, such as nitro groups, acylamino groups, ester groups, etc. The lipophile or hydrophile groups are then introduced either directly or by first replacing the groups which are unreactive with the hydrophile or lipophile groups with groups which are reactive with them. Hydrophile compounds may be built up, for instance, by introducing compounds containing aromatic groups, such as aromatic amines or phenols and then making these groups water soluble by subsequent sulfonation, or by converting the amino groups into water soluble quarternary ammonium compounds or by treating the amino or hydroxyl groups with 1,2-alkylene oxides, such as ethylene oxide, or by esterifying the hydroxyl groups subsequently with inorganic or organic polybasic acids, such as sulfuric acid.

Lipophile or hydrophile compounds may be built up by first carrying out the condensation with an amino alcohol, thereafter esterifying the free hydroxyl group with a higher molecular carboxylic acid especially fatty acid halogenide, produces a lipophilic compound, while condensing with ethylene oxide or esterifying with a dibasic inorganic acid, such as sulfuric acid, produces a hydrophilic compound. One may also introduce first an alkylene or arylene diamine whose one amino group is acylated and upon splitting of the acyl group introduce into the free amino group a higher molecular carboxylic acid, especially a fatty acid group, or the amino groups may be converted into a water soluble quarternary ammonium group. Instead of using a diamine in the first step, 3- or 4-nitraniline, such as obtained by reducing the nitro group after condensation with the amino group, may be used, and then proceeding as described above. Another method for the successive introduction of lipophile groups consists of first condensing the halogen containing heterocyclic compounds with amino carboxylic acids and subsequently esterifying the free carboxyl group in the condensation product with a higher molecular alcohol, especially with fatty alcohol or subsequently the hydroxy group with a higher molecular alkyl amine.

The condensation of the invention may also be carried out by linking together two or more molecules of the heterocyclic compounds with at least two —C(halogen)=N— groups, for instance, by the use of alkylene or arylene di- or polyamines and introducing into the obtained condensation product lipophile and hydrophile groups. The steps may also be taken in the opposite order such as by first introducing the lipophile and/or hydrophile groups into the heterocyclic compound and then linking together the condensed halogen-containing heterocyclic compounds through the amines.

If it is undesirable in the present condensation process to convert all halogen atoms of the heterocyclic compounds having at least two C(halogen)=N— groups with lipophile or hydrophile compounds, a halogen atom may be left unchanged as, for instance, in cyanuric chloride. On the other hand, the extra halogen atom may be converted in the customary manner into a hydroxyl, amino, substituted amino or mercapto group by reaction with alkalis, such as, for instance, sodium carbonate, ammonia, or with their organic substitution products, or with sulfur alkalis. It is also possible to introduce by means of this halogen atom, as well as with the aid of suitable intermediaries, such as, for instance, the di- or polyamines described above, one or more additional cyanuric halogenide molecules.

The following examples in which the parts are expressed in parts by weight will serve to illustrate the processes and the products of the instant invention.

*Example 1*

346 parts of water-free metanilic acid and 80 parts of sodium hydroxide are dissolved together in 500 parts of water. This solution is added to a finely divided suspension, made in the well-known manner, of 185 parts of cyanuric chloride in 2500 parts of ice water and stirred until the cyanuric chloride is completely dissolved. Then a saturated solution of 197 parts of N-methyl dodecyl amine in alcohol is gradually and thoroughly stirred in and the mixture is warmed to room temperature, thereupon 168 parts of sodium-bicarbonate and 1000 parts of tetrahydrofurfuryl alcohol are added. The mixture is heated to boiling under reflux and is neutralized with solid sodium carbonate, whereby the condensation is complete. The condensation product having the following structural formula,

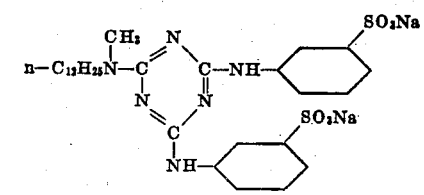

is separated in the form of the acid salt by the addition of sodium chloride and hydrochloric acid, filtered and dried. This dried product is an amorphous yellowish powder yielding a strongly foaming colloidal aqueous solution and showing excellent capillary activity.

*Example 2*

A concentrated aqueous solution of 297 parts of the disodium salt of the aniline-3,5-disulfonic acid is added to a finely divided suspension of 185 parts of cyanuric chloride in 2500 parts of ice water. Upon dissolution of the suspension under vigorous stirring 258 parts of n-octylamine and thereafter 150 parts of crystallised sodium acetate and 500 parts of glycol-monoethyl-ether are added. Then the mixture is heated gradually up to 90° C. and solid sodium carbonate is added until a litmus neutral reaction is attained. As soon as the solution is neutral, the condensation product begins to separate in the warmth. After cooling the product is filtered off and dried. The reaction product is a laminated mass, colloidally soluble in hot water forming solutions of soap-like properties.

*Example 3*

163 parts of sodium salt of β-amino ethyl sulfuric acid are added to a finely divided suspension of 185 parts of cyanuric chloride in 5000 parts of ice water. After a brief stirring, 93 parts of aniline are added and after it is dissolved 300 parts of crystallized sodium acetate are added. The temperature is now raised to 20° C. and maintained at this point for half an hour. Then one gram equivalent of a commercial mixture of the mono-amines having from 8 to 14 carbon atoms is added. Such commercial mixtures may be obtained by the conversion of a commercial mixture of n-alkyl chlorides having 8 to 14 carbon atoms with an excess of alcoholic ammonia in an autoclave and subsequently separating the secondary amines formed in side reactions. After the addition of the amine mixture the solution is heated on a water bath while being stirred and a litmus-neutral reaction is maintained by carefully adding sodium carbonate. As soon as the solution no longer has a tendency to acidify a slight litmus alkaline reaction is produced by a further addition of sodium carbonate and the resulting reaction product is isolated by salting out and filtering. On drying a grey powder is obtained which yields a colloidal foaming capillary-active aqueous solution. The structural formula of the product is as follows:

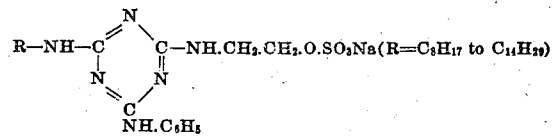

Similarly, the condensation product may be built up from 1 mole each of cyanuric chloride, methyl taurine, aniline, and primary amines having 8 to 14 carbon atoms or an analogous condensation product may be obtained from 1 mole each of 2,4-dichlorquinazoline, methyl taurine, and primary amines having 8 to 14 carbon atoms.

*Example 4*

A solution of 150 parts of amino acetic acid in 600 parts of water is added to a finely divided suspension, as prepared in the foregoing examples, of 185 parts of cyanuric chloride in 2500 parts of ice water and then solid sodium bicarbonate is carefully added until a litmus-neutral reaction is reached and a clear solution is obtained. The temperature is allowed to rise to 20° C., and 267 parts of oleyl amine, 150 parts of crystallized sodium acetate and 500 parts of dioxane are added and the conversion is completed by heating on a water bath while being stirred energetically. The solution is made distinctly alkaline to litmus by adding sodium carbonate and the condensation product is filtered off and dried. The separation of the condensation product may be facilitated by adding sodium chloride.

In lieu of the amino acetic acid equivalent quantities of methyl amino acetic acid or imino diacetic acid may be used.

*Example 5*

A concentrated aqueous solution of 297 parts of the disodium salt of the aniline 2,5-disulfonic acid are added to a finely divided suspension of 185 parts of cyanuric chloride in 5000 parts of water and stirred at room temperature until the cyanuric chloride is completely dissolved. Then 136 parts of m-amino formanilide and 300 parts of crystallized sodium acetate are added and the stirring is continued at room temperature until a test indicates the disappearance of the amino formanilide. Now 800 parts of a 30% caustic soda are added and the solution is briefly heated on a water bath until the formyl group has split off and the third chlor-atom of the cyanuric chloride is substituted by a hydroxyl group. The solution is cooled in ice, and 150 parts of sodium acetate are added. Then 300 parts of oleic acid chloride dissolved in three times as much acetone are slowly introduced. When the conversion is completed the reaction product is separated by adding sodium chloride and filtering. The filtered and dried reaction product is an amorphous powder. It is soluble in water producing foam and has capillary active and pronounced colloidal properties.

*Example 6*

As a first step, a primary condensation product is prepared from 185 parts of cyanuric chloride and 297 parts of aniline-3,5-disulfonic acid as shown in Example 2. To this aqueous solution maintained at room temperature, which is strongly mineral acid, a concentrated warm solution of 138 parts of m-nitraniline in methanol are gradually added while being vigorously stirred, and then 300 parts of crystallized sodium acetate are added. Stirring is continued at 45-50° C. until the first finely divided m-nitraniline is dissolved. Then 150 parts of para-tertiary butyl aniline and also 300 parts of crystallized sodium acetate are added and the mixture is boiled until the butyl aniline is dissolved. The solution so obtained is gradually introduced, while being stirred into a boiling mixture of 200 parts of cast iron turnings, 750 parts of water and 15 parts of glacial acetic acid. Upon completing the reduction the mixture is made strongly alkaline by adding sodium carbonate. The iron precipitate is subjected to a thorough additional washing with hot water and filtered in a hot state. Then the reduction product is salted out of the filtrate. The filtered precipitate is stirred while moist into five times as much water and some calcium lye is added and is treated in an autoclave while being heated gradually to a temperature of 100° to 120° C., with 660 parts of ethylene oxide until the completion of the ethylene treatment is indicated by a decrease in pressure. The reaction product so obtained is worked up in the usual manner and dried.

*Example 7*

242 parts of 2-phenoxy-4,6-dichlor-1,3,5-triazine are dissolved in sufficient alcohol to avoid heating. 500 parts of cyclohexyl amine are gradually added to the solution while being cooled and then heated until the alcohol boils, whereupon the conversion is completed. Upon the addition of 270 parts of a 30% caustic soda, the alcohol and the excess cyclohexyl amine is driven off with steam and the residue is filtered, dried and heated on a water bath with approximately a seven-to tenfold quantity of concentrated sulfuric acid until a sample dissolves clearly in a diluted warm sodium carbonate. Then the cooled-off sulfonating fusion is poured on ice and the sulfonated product is separated in the customary manner. In lieu of the cyclohexyl amine, alkyl groups containing 6 to 10 carbon atoms may be substituted in the hydroaromatic group.

*Example 8*

A concentrated aqueous solution of 164 parts of the mono-sodium salt of the β-mercapto ethane sulfonic acid is added to a finely divided suspension of 185 parts of cyanuric chloride in 5000 parts of ice water and thereupon a solution of 106 parts of calcined sodium carbonate in 1000 parts of water is gradually added at a temperature of 0° to 5° C. Upon completing the conversion, a slightly warmed and preferably concentrated alcoholic solution of 241 parts of cetyl amine is introduced at a temperature of 20° to 25° C. and after disappearance of the free amine the condensation product obtained is filtered off. The condensation product is then introduced without intermediate drying into a fusion, prepared on a water bath of 160 parts of sulfur and 1200 parts of crystallized sodium sulfide and stirred at water-bath temperature. Thereafter the fusion is diluted with water, precipitated with sodium chloride and the obtained precipitate purified by dissolving again in hot water, acidifying and salting out, whereupon it is dried. The so-obtained condensation product has the following structural formula:

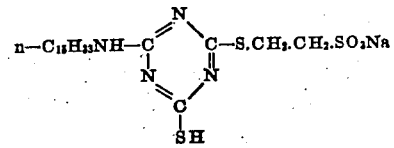

*Example 9*

One hundred and eighty-five parts of cyanuric chloride are dissolved at room temperature in the required quantity of toluol. A concentrated solution of 61 parts of β-amino ethyl alcohol in toluol is slowly added to this solution at a temperature of 15° to 20° C. and thereafter 70 parts of waterfree potassium carbonate are added. After half an hour of stirring at room temperature, 2 moles of a commercial mixture of the alkyl amines containing 6 to 18 carbon atoms are gradually introduced into the toluol solution and after that 150 parts of water-free potassium carbonate is added. Such alkyl amines may be obtained by catalytic high pressure reduction of the cocoanut oil fatty acids to the corresponding alcohols, esterizing with hydrochloric acid and converting the mixture of the alkyl chlorides containing 6 to 18 carbon atoms with ammonia. After adding the alkyl amines the solution is stirred for another hour at room temperature and then heated while being stirred vigorously on a water bath until all the chlorine of the cyanuric chloride is converted. Then the reaction mixture is introduced into an autoclave and treated with 880 parts of ethylene oxide at an approximate temperature of 100° to 110° C. in the presence of 0.5% potassium ethylate. Upon completion of the ethylene oxide treatment, one distills off the toluol, dissolves the residue in much hot water, filters, salts out the filtrate and manipulates the precipitate so obtained in the usual manner.

*Example 10*

A concentrated aqueous solution of 347 parts of the di-sodium salt of the 1-naphthyl amine 3,6-disulfonic acid is gradually added to a finely divided suspension of 185 parts of cyanuric chloride in 5000 parts of ice water whereby the temperature is maintained at +5° to 10° C. When the cyanuric chloride is completely dissolved, 122 parts of β-amino ethyl alcohol are added and after being stirred for a while at room temperature a 10% solution of sodium carbonate is added until a litmus-neutral reaction is obtained. Then the solution is heated on a water bath and more sodium carbonate is carefully added until the litmus reaction remains neutral in the heated condition. The solution is again cooled to 5° C. and 160 parts of pyridine are added and 437 parts of lauric acid chloride are introduced drop by drop at this temperature. Upon completion of the reaction the condensation product consists principally of a compound having the following structural formula:

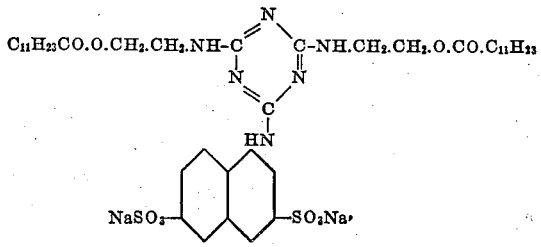

The condensation product is worked up in the usual manner.

*Example 11*

A concentrated aqueous solution of 325 parts of the mono-sodium salt of the 2-naphthyl amine 6,8-disulfonic acid (amino-G-salt) and 40 parts of sodium hydroxide is gradually added to a finely divided suspension of 185 parts of cyanuric chloride in 2500 parts of ice water. Thereafter the temperature is allowed to rise to 20° C. and a concentrated alcoholic solution of 205 parts of p-octyl aniline is introduced in drops. Then 300 parts of crystallized sodium acetate and 500 parts of tetrahydro-furfuryl alcohol are added. After the octyl aniline has been dissolved completely 300 parts of 25% ammonium hydroxide are added and the mixture is heated on a water bath until the conversion is complete. The reaction product is worked up as in previous examples by salting out, filtering and drying the condensation product. In place of the p-octyl aniline 4-amino phenol n-octyl ether may be used.

*Example 12*

One hundred and sixty-three parts of 4-methyl 2,6-dichlor pyrimidine are dissolved in twice as much acetone and the solution is poured into 2500 parts of cold water while being stirred vigorously. A concentrated aqueous solution of 450 parts of the trisodium salt of the 1-naphthyl amine 3,6,8-trisulfonic acid is added to this finely divided suspension and stirred at room temperature until the suspension is completely dissolved. Then 345 parts of N-octadecyl aniline, 300 parts of crystallized sodium acetate and 1000 parts of monoethyl-glycolether are added at a temperature of 90° to 100° C. under energetic stirring until the octadecyl aniline has disappeared. Thereafter the condensation product is salted out in a hot state, filtered and dried.

*Example 13*

Two hundred and eighty parts of N-methyl taurine are added to a finely divided suspension of 185 parts of cyanuric chloride in 2500 parts of water at a temperature of 0° C. and thereafter 300 parts of crystallized sodium acetate are added. The temperature is allowed to rise to 20° C., and 300 parts more of crystallized sodium acetate are added and the solution is stirred for one hour at a temperature of 40° to 45° C. A warm alcoholic solution of 290 parts of mono lauroyl 1,4-phenylene diamine is stirred in and then solid sodium carbonate is carefully added so as to constantly maintain a slight litmus-acid reaction while the temperature is gradually increased to boiling. Stirring is continued at the boiling temperature until the conversion is complete. The solution is then saturated with sodium chloride and the condensation product is separated and worked up in the usual manner.

An equivalent quantity of oleyl amine or a mixture of the alkyl amines containing 8 to 14 carbon atoms may be used in this condensation in place of the mono-lauroyl 1,4-phenylene diamine. The condensation may also be carried forward by 1 mole of cyanuric chloride, 1 mole of methyl taurine, 1 mole of octyl amine and 1 mole of a mixture of alkyl amines containing 8 to 14 carbon atoms.

*Example 14*

Three hundred and seventy-three parts of m-amino phenyl trimethyl ammonium chloride are added to a finely divided suspension of 185 parts of cyanuric chloride in 2500 parts of ice water whereupon the suspension dissolves very quickly. After stirring for a quarter of an hour at a temperature of 20° C. 300 parts of crystallized sodium acetate are added and thereafter 353 parts of n-di-dodecyl amine and 1000 parts of tetrahydrofurfuryl alcohol are added while being heated and energetically stirred until the reaction mixture boils. In the meantime a 15% sodium carbonate solution is carefully added until a steady litmus-neutral reaction is obtained. On salting out, filtering and drying the condensation product of the following structure formula is obtained in solid form:

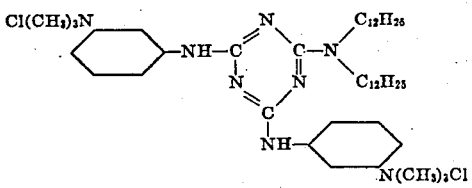

The product yields soap-like aqueous solutions.

Example 15

One hundred and sixteen parts of acymmetric diethyl ethylene diamine are gradually added to an ice-cold alcoholic solution of 185 parts of cyanuric chloride at a temperature of 0° to 5° C. and after half an hour of additional stirring, a concentrated alcoholic solution of 185 parts of n-dodecyl amine is added. The temperature is then increased to 20° C. and 82 parts of finely powdered water-free sodium acetate are added and the stirring continued until no free dodecyl amine is left. The solution is again cooled to +5° C. and a solution of 40 parts of sodium hydroxide in 800 parts of alcohol is added gradually while being stirred thoroughly. The sodium chloride formed and the largest part of sodium acetate is separated thereafter by means of suction filtration. Then the filtrate is heated with 126.5 parts of benzyl chloride under a reflux condenser on a water bath for a short time until the treatment with the benzyl chloride is completed. Upon distilling off the alcohol a condensation product remains having the following structural formula:

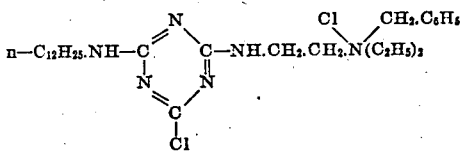

The product is an amorphous substance which is easily soluble and foams in water. The compound possesses high disinfecting properties.

Example 16

A concentrated solution of 200 parts of 2,4-dichlorquinazoline in acetone is poured into 5000 parts of ice water under vigorous stirring. Then 297 parts of the disodium salt of the aniline 2,5-disulfonic acid in concentrated aqueous solution is added and stirring is continued at a temperature of 20° C. until the precipitate is clearly dissolved. After 258 parts of n-octyl amine is added, the solution is heated on a water bath until the reaction is finished. The separation of the excess octyl amine and the other processing are done in the customary manner.

Example 17

194 parts of 2-ethoxy 4,6-di-chlor-1,3,5-triazine are dissolved in as little acetone as possible and the solution is poured, while being stirred, into 2000 parts of water at room temperature. Then 169 parts of N-oxy-ethyl taurine and 150 parts of crystallized sodium acetate are added. After everything has been clearly dissolved 211 parts of secondary octyl cyclohexyl amine and an additional 150 parts of crystallized sodium acetate are added, and the whole solution is then heated on a water bath until the conversion is finished. The condensation product is isolated as described in the preceding examples.

Example 18

First, a condensation product is prepared from 2 moles of cyanuric chloride, 2 moles of aniline-3,5-disulfonic acid and 1 mole of m-phenylendiamine. Then 370 parts of n-dodecyl amine are dissolved in 400 parts of alcohol and this solution is added together with 150 parts of crystallized sodium acetate and 1000 parts of tetrahydrofurfuryl alcohol to the above reaction mixture. Thereafter, the mixture is heated on a water bath until the conversion is completed. The processing is completed in the customary manner. The condensation product has the following structural formula:

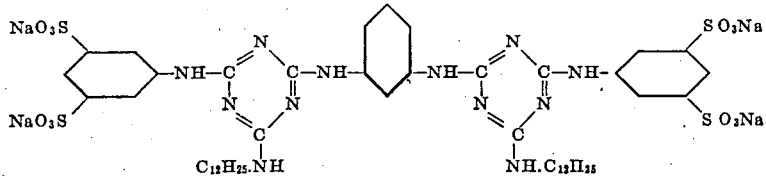

Example 19

Purified egg albumin, casein or other such compounds as chrome leather residues are fully hydrolysed in the known manner with strong hydrochloric acid by cooking. Thereafter the excess acid is largely eliminated by moderate heating under strongly diminished pressure. The mixture of amino acids remaining as residue is dissolved in water and the solution is made neutral to litmus and filtered if desired. From the filtrate one portion is taken which according to analysis contains one gram equivalent of $NH_2$ and is added to an ice-cold aqueous suspension of 185 parts of cyanuric chloride prepared as usual. By carefully adding sodium bicarbonate, while cooling with ice a clear solution is prepared. The remaining two chlorine atoms of the cyanuric chloride are successively substituted by the n-dodecyl amino and by the amino group. Thereafter the condensation product is isolated.

Example 20

One hundred and seventy-nine parts of 2-methyl amino 4,6-dichlor 1,3,5-triazine are brought to a finely divided suspension by dissolving in as little acetone or alcohol as possible and by stirring the solution in 5000 parts of water. To this a concentrated aqueous solution of 181 parts of glucamine and 150 parts of crystallized sodium acetate is added at a temperature of 20° to 25° C. and stirred until the precipitate is dissolved. Then 185 parts of n-dodecyl amine and an additional 150 parts of crystallized sodium acetate are added. The mixture is stirred at water-bath temperature until the dodecyl amine has disappeared and is then worked up as heretofore. In order to increase water solubility, the product may be treated with ethylene oxide.

Example 21

An etheric solution of 370 parts of n-dodecyl amine is gradually added to a solution, cooled off to 0° C., of 185 parts of cyanuric chloride in the required quantity of ether, but at a temperature not in excess of +5° C. The solution is stirred briefly at a temperature of 0° C. to 5° C., then the temperature is allowed to rise to 20° C., and the precipitated dodecyl amine chlorhydrate is separated by means of suction filtration and then the filtrate is steamed until dry. The raw 2-dodecyl amino 4,6-dichlor 1,3,5-triazine, obtained with an almost quantitative yield, is heated with an excess of a 10% solution of ammonia in alcohol for 2 hours to a temperature of 100° C. Then the ammonia and alcohol are distilled off and the remaining 2-dodecyl amino 4,6-diamino 1,3,5-triazine is washed free of salt with hot water. Upon drying, the product is dissolved, while heating, in an autoclave in 1500 parts of toluol. Then 5 parts of sodium ethylate are added while being stirred and heated to 100° to 120° C., and thereafter 880 parts of ethylene oxide are introduced. The stirring and heating is continued until the decreased pressure indicates the end of the condensation. Then the toluol is distilled off, the residue dissolved in water, the solution neutralized, filtered and the filtrate precipitated with sodium chloride. The condensation product obtained in the form of an amorphous precipitate is filtered and dried.

*Example 22*

The first steps of the preceding example are followed exactly. The 2-dodecyl amino 4,6-dichlor 1,3,5-triazine, remaining after evaporation of the ether, is heated with 6000 parts of a 2% caustic soda until all chlorine is split off. Then the hydrochloride is neutralized and the 2-dodecyl amino 4,6-dihydroxy 1,3,5-triazine is filtered and dried. Now the product is treated with ethylene oxide in the manner described in the foregoing example, only with the exception that 1100 parts of ethylene oxide are used. The so-obtained condensation product is worked up in the usual manner.

*Example 23*

One hundred and thirty-nine parts of m-nitrophenol are heated in an autoclave to 100° C. with 2000 parts toluol and 5 parts of potassium ethylate, and 1320 parts of ethylene oxide are introduced under pressure at a temperature of 100° to 120° C. as long as the reaction continues. After the decreased pressure has indicated the end of the reaction, the toluol is distilled off, the residue is taken up in water and the aqueous solution is reduced in the customary manner with iron and a small amount of acetic acid. The solution is made alkaline with caustic soda and free from iron by filtering. The resulting solution containing a polyglycol ether of m-amino phenol of the general formula H$_2$N-C$_6$H$_4$-O-(CH$_2$-CH$_2$-O)$_x$-CH$_2$-CH$_2$-OH is rendered exactly neutral to litmus with the aid of hydrochloric acid and added gradually to a finely divided suspension prepared in the customary manner from 185 parts of cyanuric chloride and 500 parts of water, at a temperature of 5° to 10° C.

After the cyanuric chloride has reached the solution stage a concentrated alcoholic solution of 370 parts of n-dodecyl amine is poured into it while permitting the temperature to rise to 20° C., then 600 parts of crystallized sodium acetate are added and after being stirred for half an hour at a temperature of 20° C., the temperature is increased to 90° to 100° C. At this temperature stirring is continued until all the dodecyl amine has disappeared. The condensation product is salted out, filtered and dried.

It should be understood that the present invention is not limited to the specific processes, compounds, and compositions herein disclosed but that it extends to all equivalent compounds, compositions, and processes which one skilled in the art would consider within the scope of the appended claims.

*Example 24*

333 parts of 2-dodecylamino-4,6-dichlor- 1,3,5-triazine (melting point 65–66° C.) are dissolved in 1500 parts of alcohol. This solution is mixed with a solution of 280 parts of methyl taurine and 300 parts of crystallized sodium acetate in 1500 parts of water and is heated to boiling under reflux. In the reaction mixture the acetic acid formed is neutralized with concentrated soda lye. After the conversion is finished, the reaction mixture is cooled and shaken out with diethyl ether. The diethyl ether is distilled off and leaves behind a colourless, tough mass. This product has the following structural formula:

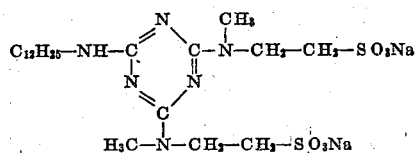

The condensation product is easily soluble in water having excellent foaming and washing properties. A lipophile group is a group which in combination with a water-solubilizing group has capillary-active or soap-like characteristics. The compounds from which such groups are derived have fatty or fat-like characteristics. Such groups include aliphatic and cycloaliphatic hydrocarbon groups of at least 6 carbon atoms and aromatic hydrocarbon groups substituted by an aliphatic or cycloaliphatic hydrocarbon group of at least 4 carbon atoms. "Lipophile groups" when used in the appended claims is to be understood to mean one of the aforesaid groups.

It is clear from the preceding specific examples that the preferred lipophile groups of the present invention constitute aliphatic or cycloaliphatic hydrocarbon groups of at least 6 carbon atoms and preferably constitute aliphatic hydrocarbon groups of at least 8 carbon atoms.

We claim:

1. A capillary-active mononuclear heterocyclic compound containing from two to three —C(X)=N— groups forming part of the same heterocyclic nucleus, said nucleus containing only carbon and nitrogen atoms and being selected from the group consisting of azine nuclei and azole nuclei wherein an X is an aliphatic hydrocarbon of at least 6 carbon atoms joined to the nucleus through an amino nitrogen atom; an X is a lower molecular aliphatic hydrocarbon radical containing a water-solubilizing group joined to the nucleus through an amino nitrogen atom; and any remaining X is selected from the group consisting of halogen, hydroxy, amino, mercapto and alkoxy radicals.

2. A capillary-active mononuclear heterocyclic compound containing from two to three —C(X)=N— groups forming part of the same heterocyclic nucleus, said nucleus containing only carbon and nitrogen atoms and being selected from the group consisting of azine nuclei and azole nuclei wherein an X is an aliphatic hydrocarbon of at least 6 carbon atoms joined to the nucleus through an atom of the group consisting of amino-nitrogen, mercapto-sulfur, and ether-oxygen atoms; an X is a lower molecular aliphatic hydrocarbon radical containing a water-solubilizing group joined to the nucleus through an atom of the group consisting of amino-nitrogen, mercapto-sulfur, and ether-oxygen atoms; and any remaining X is selected from the group consisting of halogen, hydroxy, amino, mercapto and alkoxy radicals.

3. A capillary-active mononuclear heterocyclic compound containing from two to three —C(X)=N— groups forming part of the same heterocyclic nucleus, said nucleus containing only carbon and nitrogen atoms and being selected from the group consisting of azine nuclei and azole nuclei wherein an X is an aliphatic hydrocarbon of at least 6 carbon atoms joined to the nucleus through an atom of the group consisting of amino-nitrogen, mercapto-sulfur, and ether-oxygen atoms; an X is a lower molecular aliphatic hydrocarbon radical containing a neutralized sulfonate group joined to the nucleus through an atom of the group consisting of amino-nitrogen, mercapto-sulfur, and ether-oxygen atoms; and any remaining X is selected from the group consisting of halogen, hydroxy, amino, mercapto and alkoxy radicals.

4. A capillary-active mononuclear heterocyclic compound containing from two to three —C(X)=N— groups forming part of the same heterocyclic nucleus, said nucleus containing only carbon and nitrogen atoms and being selected from the group consisting of azine nuclei and azole nuclei wherein an X is an aliphatic hydrocarbon of at least 6 carbon atoms joined to the nucleus through an atom of the group consisting of amino-nitrogen, mercapto-sulfur, and ether-oxygen atoms; an X is a lower molecular aliphatic hydrocarbon radical containing a quaternary ammonium salt group joined to the nucleus through an atom of the group consisting of amino-nitrogen, mercapto-sulfur, and ether-oxygen atoms; and any remaining X is selected from the group consisting of halogen, hydroxy, amino, mercapto and alkoxy radicals.

5. A capillary-active mononuclear heterocyclic compound containing from two to three —C(X)=N— groups forming part of the same heterocyclic nucleus, said nucleus containing only carbon and nitrogen atoms and being an azine nucleus wherein an X is an aliphatic hydrocarbon of at least 6 carbon atoms joined to the nucleus through an amino nitrogen atom; an X is a lower molecular aliphatic hydrocarbon radical containing a water-solubilizing group joined to the nucleus through an amino nitrogen atom; and any remaining X is selected from the group consisting of halogen, hydroxy, amino, mercapto and alkoxy radicals.

6. A capillary-active compound having substantially the following formula:

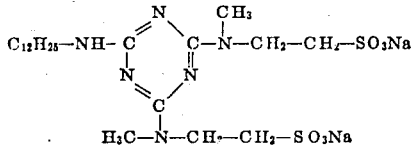

7. A capillary-active compound having substantially the following formula:

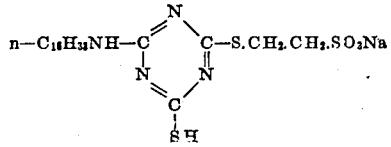

8. A capillary-active compound having substantially the following formula:

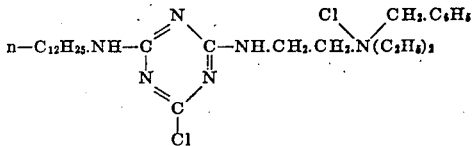

WINFRID HENTRICH.
ERIK SCHIRM.